INVENTORS
G.L. BRIDGER
R.W. STAROSTKA

BY

ATTORNEY

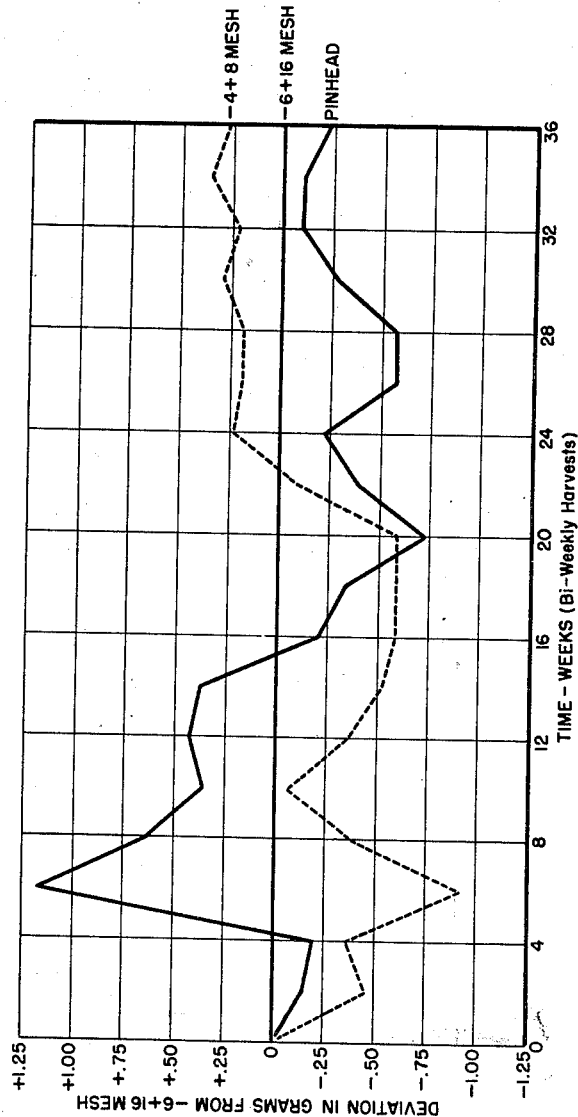

United States Patent Office 3,181,943
Patented May 4, 1965

3,181,943
METHOD OF SUPPLYING NITROGEN AND PHOSPHORUS NUTRIENTS TO PLANTS
Grover L. Bridger, Baltimore, Md., and Raymond W. Starostka, Winnetka, Ill., assignors to W. R. Grace & Co., New York, N.Y., a corporation of Connecticut
Filed Dec. 2, 1963, Ser. No. 327,472
1 Claim. (Cl. 71—36)

This is a continuation in part of our copending application Serial No. 80,730, filed January 5, 1961, now abandoned.

This application relates to a fertilizer material suitable for fertilizing living plants. More particularly, it relates to a method of fertilizing growing plants without danger of plasmolysis.

In summary, this invention is directed to a method for supplying vital nutrients to plants having a specified growing time in a given soil without producing plasmolysis of said plants. Said method comprises applying granular magnesium ammonium phosphate fertilizer of a mesh size which, based on the nitrification characteristics of said given soil and the length of said growing time, will release nitrogen throughout said growing time and will be virtually deplete with respect to said nitrogen at the end of said time, and introducing said granular magnesium ammonium phosphate into said given soil at the onset of said growing time.

Preferred embodiments of this invention include: (a) granulating magnesium ammonium phosphate fertilizer, classifying said granules into a predetermined number of mesh sizes, determining the percent of nitrification of each mesh size as a function of time in the specific soil to be fertilized, selecting the mesh size for which virtually 100% nitrification is achieved in a time corresponding to the specified growing time of the plants to be grown on the fertilized soil, and treating the soil with a fertilized quantity of the granulated magnesium ammonium phosphate of said selected mesh size; (b) applying the magnesium ammonium phosphate fertilizer of the mesh size which the test results presented in Table I have shown to give substantially complete nitrification during various growing periods.

Figure 1:
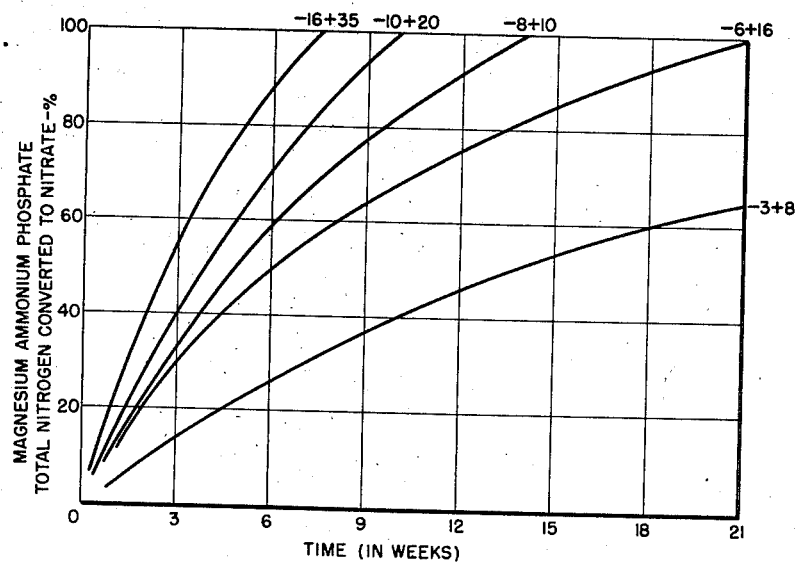
Figure 2:
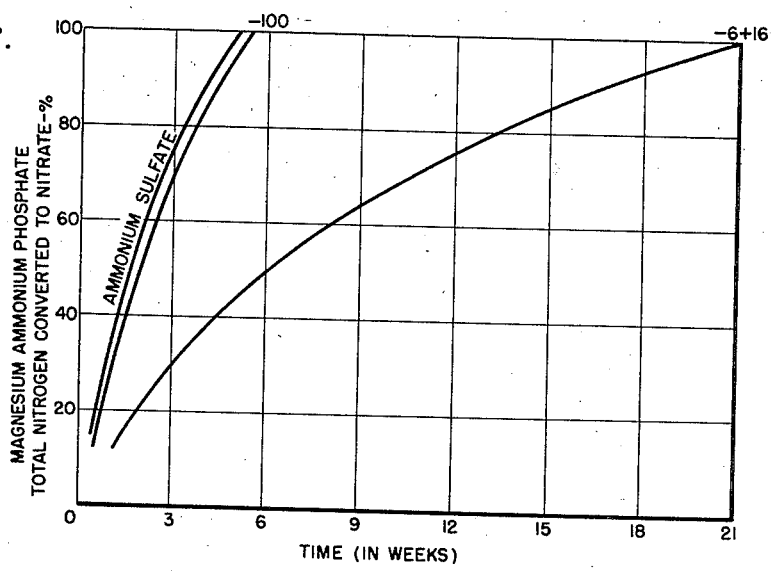

In the drawings: FIG. 1 shows the rates of nitrification of granular magnesium ammonium phosphate in soils. FIG. 2 compares the rates of nitrification of granular magnesium ammonium phosphate, powdered magnesium ammonium phosphate, and ammonium sulfate. FIG. 3 is a comparison in the growth response of rye grass to fertilization with magnesium ammonium phosphate of three different mesh sizes (−16 +35, −6, +16, and −4 +8).

It is a well-known fact that the germination of seeds may be prevented or established crops may be injured by the presence of too much soluble salt in the soil. This phenomenon may occur even though all of the elements which the plant requires for its proper nutrition are present in normal proportions to one another and substances that exhibit specific plant toxicity effects are not present in excess. This type of injury must therefore be connected with the high concentration of salts in the soil solution, and it has been commonly thought that the elevated osmotic pressure of such solutions is responsible for such injury. This has been borne out by experimental studies which have clearly demonstrated that growth reduction of several crops was linear with the increasing osmotic pressure of the substrate over the range from 0.4 to 4.4 atmospheres absolute and that a number of crop species died when the osmotic pressure of the culture reached 4.5 atmospheres absolute.

Except under unusual conditions the osmotic pressure of the soil solutions should never become high enough to injure the crop when the fertilizer is uniformly broadcast. When the fertilizer is localized in a small zone, however, as in various special placements, the soluble portion of the fertilizer dissolves only in the soil moisture immediately surorunding that zone. This results in local areas of salt solution many times as concentrated as that met with in broadcast application and not infrequently injury to plants follows if due precautions are not taken. Simply reducing the amount of fertilizer to avoid injury might mean going below the optimum amount of plant food for maximum crop growth or necessitate repeated applications of plant foods.

The osmotic pressure produced in the soil solution by a given salt application is the result of many factors. Among these may be mentioned the quantity of salt added, the amount of moisture in the soil, base exchange, and other reactions into which the added salt may enter, temperature, and the amount of biological action in the soil.

Some fertilizers react with the constituents of the soil to a much greater extent than others. A mixture containing a high proportion of soluble salts that undergo fixation in the soil may therefore increase the concentration of the soil solution less than one containing a lower percentage of soluble salts that are not fixed in the soil. The soluble salt content of different fertilizer mixtures cannot therefore be employed as an accurate measure of their influence on the soil solution.

The composition of the fertilizer, especially the relative proportion of divalent and monovalent elements, is of particular importance insofar as the dissociation of the fertilizer salts into ions is concerned. It must be recalled that osmotic pressure, as a colligative property of solutions, is dependent primarily on the number rather than the nature of the particles formed.

The actual damage done is an effect known as "burning" because firing or scorching of the leaves of the plants is often a symptom of such injury. In general, when water is lost from plants by transpiration, excess dissolved salts may remain in the plant cells. Also, water actually passes from the roots by osmosis. The reason for such a transaction is easily understood when the principle of osmosis is recalled. Osmotic pressure represents the tendency of the solvent, in this instance water, to pass through a semipermeable membrane, in this instance the cell wall, from a region containing a solution with a higher solvent fugacity (in this instance the interior of the cells of plants) to one of lower solvent fugacity (in this instance the exterior of the cells of plants, i.e., the soil liquor about the surface of the plants' roots). This situation of unequal fugacities is due to the difference in the concentrations of the "solutions" on the two sides of the cell wall. On the one side, there is the fertilizer dissolved in the moisture available in the soil. This makes a fairly concentrated solution. On the other side (i.e., on the inside of the cell) the solution comprises protoplasm, a viscid, grayish, translucent, colloidal substance of granular structure and complex composition. In it are dissolved the minerals, enzymes, and other constituents necessary for the life of the cell.

When the fugacity of the solvent (water) outside the cell is sufficiently low, water from the protoplasm leaves the cell, thereby resulting in protoplasmic shrinking or plasmolysis. The ultimate result is the total destruction of the cell. It is such destruction that is generally termed plant burning, and is, as has been shown, a direct consequence of heedless fertilization.

On the other hand, fertilization is necessary; such substances as nitrogen and phosphate must be supplied to all plants if they are to flourish. Many other elements are also needed for healthy crops.

Some plants, such as corn and small grains, are able to utilize nitrogen in the organic form, such as acetamide and a number of amino acids. However, most of the nitrogen found in plant tissues in proteins or in other forms was originally absorbed as nitrate or ammonium ions. Consequently, a good fertilizer must ultimately supply nitrogen in this form if it is to be successful. But placing a liberal supply of ions in the soil generally raises the overall concentration of soluble substances in the soil to the point where burning of the plants takes place rapidly. As stated supra, in some instances nitrogen supplied in the organic form is successful in meeting the nitrogen demands of plants and in keeping the ion concentration level of the soil below the danger point. However, this is true only under optimum conditions for nitrification of the fertilizer, i.e., the conversion of the ammonium form of nitrogen to the form of soluble nitrates. (This is accomplished chiefly through bacterial action.) Organic fertilizers are being replaced rapidly by inorganic fertilizers which can be manufactured from a relatively inexhaustible supply of raw materials. The use of inorganic fertilizer invariably introduces ions into the soil, thereby tending to produce conditions favorable to plasmolysis.

We have found that the plasmolysis problem can be solved by using magnesium ammonium phosphate as fertilizer and by controlling the rate of nitrification of the nitrogen component thereof. We have also found that, in soils having pH's up to at least about 7.5, the rate of available (citrate soluble) phosphate release from said fertilizer parallels the rate of nitrification. In this way, the rate of nutrient availability can be timed with the growth period of plants, thereby insuring greater utilization of nutrients by the plant and less loss by fixation in the soil or by leaching. However, the rate of nitrification of readily soluble fertilizers cannot be altered since dissolution takes place quickly even from large granules. Nitrification of conventional fertilizers is substantially independent of particle size.

It is an object of this invention to provide a means for adequately supplying plant nutrients without danger of burning. It is a further and more specific object of this invention to provide a means for preparing fertilizer which, after application, is available to the plants only at a controlled rate, said rate being optimum for plant growth.

We have found that magnesium ammonium phosphate fertilizer can be granulated to decrease the rate of nitrification; as the granule size increases, the rate of nitrification decreases. Further, we have found that we can correctly determine the optimum size to which the fertilizer should be granulated, so that the plants being fertilized are supplied throughout their growing time with fertilizer supplied in a single application. This is possible due to the peculiar nature of magnesium ammonium phosphate fertilizer. That is, this substance is sparingly soluble, but, when placed in soil, it ultimately decomposes to provide plants with necessary nutrients, and the rate of decomposition is such that it can be controlled through critically regulated granulation.

Generally, our invention can be utilized in one of two ways, both of which will be described below. The first method entails preliminary experimentation, so that the ultimate granule size obtained is precisely regulated to nitrification characteristics of the soil in which it will be used. The second method is an outgrowth of the first, and is based upon the fact that, since soils found in temperate zones exhibit many similarities, it is possible to predict in a general manner the appropriate size of magnesium ammonium phosphate fertilizer granules that should be used for plants having any given growing time.

Based upon the discovery that granulation can be utilized to control the rate of nitrification of magnesium ammonium phosphate, it was found that for any given soil and any given crop having a particular growing time, the optimum granule size could be predicted. Experimentally, this is performed in the following manner:

Initially, powdered magnesium ammonium phosphate must be granulated to a range of particle sizes. Any suitable equipment, such as a rotary pan, rotary drum, or pug mill can be used for this granulation. The material is generally supplied to the granulator either as a dry powder or as an aqueous slurry.

Drying of the material is accomplished in any suitable equipment (rotary drum or kiln, fired directly or indirectly). After being dried, the material is classified according to size, and the oversize particles are crushed and recycled to the granulator with the undersize particles.

In doing preliminary studies, it is ordinarily desirable to prepare granules of magnesium ammonium phosphate having at least the following mesh sizes:[1]

—16 +35 mesh [2] ("pinhead")
—10 +20 mesh
—8 +10 mesh
—6 +16 mesh ("medium")
—3 +8 mesh ("coarse")
—1 +3 mesh ("marble"—for longer applications)

[1] By "mesh size," we mean the size of the particles in U.S. Standard Mesh.
[2] Passed a 16 mesh (U.S. Standard) screen and retained on a 35 mesh (U.S. Standard) screen.

We have found that generally, mesh sizes smaller than pinhead tended to nitrify quickly, and were therefore not appreciably different from conventional fertilizers. When used at high rates they can be expected to caused plasmolysis nearly as readily as soluble materials. Where precise measurements are desired, the broader ranges of mesh sizes can be broken down into additional groups having narrower ranges of mesh sizes. For example, instead of a single set of runs using a mesh size of —3 +8, it may be desirable to run two separate studies using —3 +6 and —6 +8 mesh sizes respectively.

Before testing the mesh sizes, certain determinations should be made in the soil with which the fertilizer is intended for use. An arbitrary quantity of the soil should be taken for experimental purposes, and the pH of the soil adjusted to the pH at which plant growth will ultimately take place. Further, the moisture content of the soil should be determined, as the percent moisture at field carrying capacity. (This is defined as the maximum quantity of water a given soil will hold at equilibrium, i.e., before evaporation takes place, and after draining of water ceases.) Standard techniques are available for this determination, such as the one in Jackson, Soil Chemical Analysis, Prentice-Hall, Inc., 1958, at pages 240–241.

After making these preliminary determinations, granules of magnesium ammonium phosphate fertilizer of the mesh sizes specified supra are tested to determine the rate of nitrification of each size under the conditions present in the selected soil, using the following technique:

The initial soil sample is mixed thoroughly by passing it through a sieve (ca. 3 mesh, U.S. Standard), thereby mixing the soil while removing large pebbles, etc. Any plant material present should be broken up into small pieces. The total sample is then divided into the same number of equal portions as there are mesh sizes to be tested, plus one portion to be run as a blank. For technical accuracy, it is generally desirable to run the tests in duplicate or triplicate.

Each portion of soil is placed in a suitable receptacle. The moisture content of the soil is determined by any convenient technique, and sufficient water is added to bring the value up to about 70–80% by weight of the previously determined field-moisture capacity. At this point, the granulated magnesium ammonium phosphate fertilizer is added to the receptacles in such manner that each receptacle contains a given mesh size of said fertilizer. The fertilizer is added at the rate of 0.64 gram per pound of soil. This corresponds to the application of 225 pounds of nitrogen per acre, a value experimentally determined to produce generally optimum results (see Example II). The receptacles are marked for future identification. Thorough mixing of each sample with its respective fertilizer must be performed before the samples are incubated. Thereafter, the receptacle is covered and stored at a constant temperature of 28° to 30° C., and a constant relative humidity of about 95%. Although these conditions appear to be somewhat artificial as compared with actual growing conditions, we have found that any slight error occasioned thereby is more than offset by the evenness of results.

During the storage period, water should be added to the receptacles periodically to maintain moisture levels. Further, periodic mixing, at least weekly, provides aeration, which is an important factor affecting the rate at which nitrification takes place.

At predetermined intervals, aliquot portions are removed from each container and are tested for total nitrogen, in nitrate form. Numerous analytical procedures have been developed for this determination. In our procedures, we employed the technique described in Jackson, Soil Chemical Analysis, pages 199–201. After the nitrate content value is established, the nitrate value obtained in the blank should be subtracted for accurate results.

In determining how long to continue to incubate the samples, the experimenter should consider the longest growing time in which he is interested. For example, if the crop having the longest growing time has a growing time of 20 weeks, the samples should be incubated for at least a 20 week period.

From the data obtained above, the percent of nitrification, i.e., the percent of nitrogen from the initial dose of metal ammonium phosphate converted to nitrate can be mathematically determined for each sample at the various sampling times. These values are plotted against time, to graphically portray the percent nitrification of each given mesh size as a function of time. The effectiveness of the graph so determined in deciding upon a given mesh size of fertilizer for a crop having a given growing time can be readily seen from the following example.

EXAMPLE I

The procedure outlined above was exactly followed, using the suggested range of mesh sizes of magnesium ammonium phosphates in soils that were considered to be average temperate zone samples. Specifically, the soils used were Manor silt loam and Chester silt loam, having pH's of about 5.2 and moisture contents of about 20–25% by weight at field capacity. The experiments were conducted at moisture contents about three-fourths of field capacity. Each run was repeated 3–9 times; the final averaged results may be seen in FIGURE 1.

The operability of this first method of our invention is readily seen from the following discussion. Referring to FIGURE 1, it can be seen that the granules having a mesh size of −16 +35 reached 10% nitrification in approximately seven weeks. Hence, for any crop having a growing time of about six to eight weeks, fertilizer having this particle size would result in a sustained release of nitrogen throughout the entire growing life, and further, such release would necessarily result in extremely efficient fertilizer consumption, since at the end of the growing period, all fertilizer would have been available for crop consumption. Similarly, for any crop having a growing time of nine to ten weeks, a fertilizer having a mesh size of −10 +20 would furnish best results.

For crops having an extremely long growing period, the coarse grade of fertilizer would be preferred. Although the final time at which nitrification of the coarse (−3 +8 mesh) particles reaches completion was not determined in the experiment, it is readily seen from the an extrapolation of the curve corresponding to this material that the material gives a sustained nitrogen release over an extended period of time.

It is to be noted that the above studies are set up under non-leaching conditions. It would be obvious to one skilled in the art that under actual outdoor conditions, the naturally recurrent rainfall would induce a slightly higher rate of nitrification, owing to the fact that some of the products of nitrification would be carried, or leached, away with the drainage of water, thereby shifting the equilibrium. We have found that this phenomenon has little effect upon the choice of granule size, so long as the plants are being grown in temperate soils which are not exposed to an excessive amount of rainfall. However, under tropical conditions, and as well, under greenhouse conditions where there is a high water supply, the leaching phenomenon should be taken into account in setting up the study. This is readily attained by using the following modification of the procedure described above.

Instead of incubating the samples at a constant 20–25% of field moisture capacity, water should be supplied to the samples and allowed to drain off at a rate which would approximately equal the naturally occurring rainfall distribution. It will be noted that the results obtained will vary somewhat from those indicated in FIGURE 1, in that the curves will be shifted to the left. In other words, a slightly larger granule size will be required for crops having a given growing season than would be required under relatively non-leaching conditions to compensate for the material lost in drainage.

One of the drawbacks in the method as described above is that for the crops having a longer growing time, if only the mesh size reaching 100% nitrification at the end of such time is used, the initial release of fertilizer tends to be somewhat lower than is sometimes desired. We have been able to solve this problem by providing a blend of granule sizes, as indicated by the curve resulting from studies on fertilizer having a mesh size of −6 +16. In such a blend, the smaller granules provide instant fertilizer release, while the larger granules nitrify more slowly, thereby producing the desired result of sustained nitrogen supply. This is especially well illustrated by the shape of the −6 +16 mesh curve (FIGURE 1); said curve shows that the initial release of nitrogen is not unlike that obtained with materials consisting entirely of smaller granules. Obviously, since this particular blend reaches 100% nitrification in about twenty-one weeks, it is especially well suited to crops having a growing time in this neighborhood. However, in the same way that this blend was experimentally determined, the skilled horticulturist would have little difficulty in applying our teachings to obtain a material for crops having longer or shorter growing periods.

Method B

This method is essentially a rule of thumb for the easiest applicability of our principles, for use where quantitative accuracy in fertilization is not needed. It is applicable to most temperate soils, wherein the pH may range between about 4.5 and 7.5, and the moisture content is generally between the plant wilting point and field capacity during the growing season. Specifically, we have found that the curves shown in FIGURE 1, as determined by the methods set out above, may be directly applied successfully to determine the granule size of the metal ammonium phosphate fertilizer to be employed. We have developed the following generalizations, initially based on the theoretical curves shown in FIGURE 1, and confirmed by experimentation:

TABLE I

*Mesh sizes of metal ammonium phosphates in temperate soils*

LIGHT LEACHING

| Crop growing time | Mesh size of metal ammonium phosphate granules |
|---|---|
| 4-8 weeks | −16 +35 |
| 8-11 weeks | −10 +20 |
| 11-15 weeks | −8 +10 |
| 1 growing season [1] | −6 +16 (Medium) |
| 2 growing seasons | −3 +6 (Coarse) |
| 3-5 growing seasons | −1 +3 |

HEAVY LEACHING—GREENHOUSE

| | |
|---|---|
| 3-6 weeks | −16 +35 (Pinhead) |
| 6-9 weeks | −10 +20 |
| 9-12 weeks | −8 +10 |
| 12-20 weeks | −6 +16 (Medium) |
| 1 growing season | −3 +6 (Coarse) |
| 2-4 growing seasons | −1 +3 |

[1] Growing season is defined as the total growing time per calendar year.

Comprehensive studies were carried out on the control of nitrification through granulation of metal ammonium phosphates, indicating the success of the material in field studies and further comparing it to other known compositions. A sampling of these studies is given below. The examples are given for illustrative purposes only and are not intended to be limiting upon the scope of the instant invention.

EXAMPLE II

Studies were run to determine the best rate at which magnesium ammonium phosphate fertilizers should be applied. Powdered magnesium ammonium phosphate was tested by the method given above for nitrification determination at rates of application corresponding to 25, 75, 225, 675, 2025, and 4050 pounds of nitrogen per acre. All samples were incubated, and nitrate determinations performed after 15, 30, 45, 75, and 105 days. Generally, is was found that nitrification increased with increasing rates of N up to about 225 pounds per acre, and decreased thereafter. Nitrification, however, still occurred at the 4050 pounds of N per acre rate, indicating in part a lack of toxicity of the product. Where results are reported in excess of 100%, the assumption is that the added nitrogen stimulated nitrate release from the organic constituents of the soil. The results of the tests are summarized in Table II below:

TABLE II

*Rate of application of magnesium ammonium phosphate*

| Application Rate, Lbs. N per acre | Days | | | | |
|---|---|---|---|---|---|
| | 15 | 30 | 45 | 75 | 105 |
| 25 | 40 | 80 | 56 | 48 | 48 |
| 75 | 61 | 99 | 101 | 104 | 138 |
| 225 | 60 | 92 | 105 | 101 | 135 |
| 675 | 44 | 91 | 87 | 89 | 116 |
| 2,025 | 23 | 47 | 70 | 83 | 96 |
| 4,050 | 12 | 25 | 44 | 50 | 62 |

EXAMPLE III

Coarse granules of magnesium ammonium phosphate having a mesh size of −3 +8 were placed in soil under peach trees under atmospheric outdoor conditions, and were allowed to remain undisturbed for a period of 21 months. During this period the growth of the peach trees was compared with that of trees which had not been fertilized. At the end of the period, it was found that the fertilized trees were generally a third taller than the unfertilized members, and further, the fertilized members showed considerably more fullness. This would indicate that nutrient release was taking place.

EXAMPLE IV

Nitrification studies were performed by the technique given above comparing granulated magnesium ammonium phosphate having a mesh size of −6 +16, powdered magnesium ammonium phosphate having a mesh size of −100, and ammonium sulfate, a conventional fertilizer material. It was found that while the granular material exhibited a slow release of nitrogen, both the ammonium sulfate and powdered magnesium ammonium phosphate quickly nitrified, and were completely depleted in about four or five weeks. The nitrification curves obtained are shown in FIGURE 2. The conclusions drawn were that in order to obtain sustained fertilizer release, additional applications of the ammonium sulfate and powdered magnesium ammonium phosphate would be required to obtain the same result as that obtained with a single application of magnesium ammonium phosphate having a mesh size of −6 +16.

EXAMPLE V

Studies were conducted on Rye grass to demonstrate differences in growth responses as a function of the granule size of magnesium ammonium phosphate. The studies were carried out under controlled conditions in a growth chamber, having a constant relative humidity of 35 to 45%, a night temperature of 70° F., and a 16 hour day.

Identical quantities of seeds were sown in pots containing Chester silt loam fertilized with magnesium ammonium phosphate at a rate corresponding to 300 pounds of nitrogen per acre. The pots were maintained at a relatively non-leaching condition. Each pot was fertilized with a given mesh size magnesium ammonium phosphate. The sizes used were pinhead materials, −6 +16 mesh, and −4 +8 mesh. The grass was harvested from each pot at two week intervals, dried, and weighed.

The results of the tests may be seen in FIGURE 3. However, the −6 +16 mesh size, as the intermediate size used, was considered as a control. The curves in FIGURE 3 indicate the deviations in weight, as a function of time, from the intermediate material. It is to be noted that these curves are based upon dry weight of the material; had the grass been weighed prior to dehydration, all changes would have been increased by a factor of at least 8 to 10. However, such a technique would ultimately be less accurate, since the grass would show marked variances on fertilizer consumption.

It can be readily seen from the curves of FIGURE 3 that for the first 15 weeks, the best growth was seen in the grass which had been fertilized with the pinhead material. This would indicate that of the three sizes tested, the pinhead material would be preferred for crops having a growing time of less than 15 weeks. However, from 15 to 23 weeks, the −6 +16 mesh size gave best results, indicating that this size would be preferred for crops having a growing time falling within this range. Similarly, the larger size is preferred for crops having a longer growing time.

From the foregoing discussion, it can be seen that we have been successful in providing a fertilizer having a controlled rate of release of nutrients (i.e., N and $P_2O_5$) and which can be readily adapted, through the technique of granulation, to meet the fertilizer needs of plants having any given growing time.

We claim:

A method of supplying nitrogen and phosphorus nutrients to plants in continuing amounts coinciding substantially with the growing life of the plant, said life ranging between about 4 weeks and about 4 years, said plants being in a soil having a pH between about 4.5 and 7.5 and a soil moisture content between the plant wilting point and field capacity under non-leaching conditions, said method comprising fertilizing said plants with granules of magnesium ammonium phosphate, the mesh size of which is selected to correspond with the known growing time of the plant in accordance with the following schedule:

| Plant growing time— | Mesh size |
|---|---|
| 4 weeks | −16 +35 |
| 10 weeks | −10 +20 |
| 14 weeks | −8 +10 |
| 21 weeks | −6 +16 |
| 1 year | −3 +6 |
| 4 years | −1 +3 |

References Cited by the Examiner

UNITED STATES PATENTS 3,077,700   2/63   Tukacs _____ 47—1

FOREIGN PATENTS 492,596   9/38   Great Britain.
741,378   11/55   Great Britain.

DONALL H. SYLVESTER, *Primary Examiner.*

ANTHONY SCIAMANNA, *Examiner.*